(12) United States Patent
Wu

(10) Patent No.: US 8,930,981 B2
(45) Date of Patent: *Jan. 6, 2015

(54) TELEVISION CHANNEL MAPPING TECHNIQUES

(71) Applicant: Sony Corporation, Tokyo (JP)

(72) Inventor: Max Wu, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,090

(22) Filed: Apr. 8, 2014

(65) Prior Publication Data
US 2014/0223489 A1 Aug. 7, 2014

Related U.S. Application Data

(63) Continuation of application No. 13/229,721, filed on Sep. 11, 2011, now Pat. No. 8,745,652.

(51) Int. Cl.
| | | |
|---|---|---|
| *H04N 7/16* | (2011.01) | |
| *H04N 5/445* | (2011.01) | |
| *H04N 7/173* | (2011.01) | |
| *H04H 60/33* | (2008.01) | |
| *G06F 3/00* | (2006.01) | |
| *G06F 13/00* | (2006.01) | |
| *H04N 21/482* | (2011.01) | |
| *H04N 21/258* | (2011.01) | |
| *H04N 21/45* | (2011.01) | |
| *H04N 21/2665* | (2011.01) | |
| *H04N 21/462* | (2011.01) | |
| *H04N 21/61* | (2011.01) | |

(52) U.S. Cl.
CPC ..... *H04N 21/4823* (2013.01); *H04N 21/25841* (2013.01); *H04N 21/4524* (2013.01); *H04N 21/2665* (2013.01); *H04N 21/4622* (2013.01); *H04N 21/482* (2013.01); *H04N 21/6118* (2013.01); *H04N 21/6125* (2013.01); *H04N 21/6131* (2013.01); *H04N 21/6168* (2013.01); *H04N 21/6175* (2013.01); *H04N 21/6181* (2013.01); *H04N 2005/44547* (2013.01); *H04N 2005/44569* (2013.01); *H04N 2005/44573* (2013.01)
USPC ............... 725/20; 725/9; 725/37; 725/105; 725/109; 725/110; 725/111; 725/114; 725/115

(58) Field of Classification Search
None
See application file for complete search history.

(56) References Cited

U.S. PATENT DOCUMENTS

| | | | |
|---|---|---|---|
| 2003/0213001 A1* | 11/2003 | Yuen et al. ........... | 725/136 |
| 2005/0283799 A1* | 12/2005 | Domegan et al. ........ | 725/38 |

* cited by examiner

*Primary Examiner* — Justin Shepard
(74) *Attorney, Agent, or Firm* — John L. Rogitz

(57) ABSTRACT

In one embodiment, a television configuration technique includes determining a location, from a web service, of a television set using an internet protocol address of the television set or a zip code corresponding to a physical location of the television. Electronic programming guide, interactive programming guide or the like data for a plurality of service providers in the determined location are downloaded. The electronic programming guide data, interactive programming guide data or the like for one or more channels that are unique between the plurality of service providers are checked against transmitting station identifier data or system information protocol data to identify the specific service provider that the television set is connected to. A channel list for the specific service provider is then determined from the electronic programming guide or interactive programming guide corresponding to the specific service provider.

20 Claims, 2 Drawing Sheets

TELEVISION CHANNEL MAPPING TECHNIQUES

BACKGROUND OF THE INVENTION

Electronic devices have made significant contributions towards the advancement of modern society. An ever increasingly important aspect of electronic devices is the user experience. An important part of the initial user experience is the setup of the electronic device. Typically, for televisions the initial user experience includes configuring the television to work with one or more content providers such as a cable television provider, broadcast television stations, or the like. The process can be time consuming, resulting in a negative initial user experience with a newly purchased television.

In the conventional art, when an individual connects a television to a cable or antenna based network, an auto-program or channel-scan configuration routine (herein after simply referred to as a channel-scan routine) needs to be executed. The channel-scan routine needs to scan analog and/or digital signals to determine the available television channels. The channel-scan routine searches each of a plurality of allocated frequency bands for a signal. If a signal is present on a given frequency band, the channel-scan routine parses metadata, such as transmitting station identifier (TSID) data or program and system information protocol (PSIP) data, identifying the corresponding channel. For example, if a broadcast signal is present on the frequency band between 198 and 204 MHz, the channel-scan routine determines from the metadata that the channel is channel 11-1. Those skilled in the art appreciate that each allocated frequency band is associated with a "designated" channel number, but the metadata for each signal may provide an "advertised" or "virtual" channel number that may be the same or different from the "designated" channel number. The channel-scan routine stores data indicating that a signal is available on designated channel 11 (e.g., frequency band 198-204 MHz) and that it is advertised as channel 11-1. There may also be a plurality of channels broadcast on an allocated frequency band. For example, within a particular frequency band a primary channel (e.g., advertised channel 5-1) and up to two additional channels (e.g., advertised channels 5-2 and 5-3) may be transmitted. In such case, the channel-scan routine may store data indicating that signals are available on designated channel 5 and that they are advertised channels 5-1, 5-2 and 5-3.

The channel-scan routine typically scans a large number of allocated frequency bands for digital and/or analog content signals, and therefore may take 40 minutes or more to complete. Accordingly, there is a continuing need for an improved technique for configuring televisions that will improve the user experience.

SUMMARY OF THE INVENTION

The present technology may best be understood by referring to the following description and accompanying drawings that are used to illustrate embodiments of the present technology directed toward channel map setup of televisions.

In one embodiment, the technique includes connecting the television set to a broadcast or cable transmission network of a service provider. A location of the television set using an interim protocol address of the television set or a zip code corresponding to a physical location of the television is determined from a web service. Electronic programming guides (EPG), interactive programming guides (IPG) or the like are downloaded for a plurality of service providers in the determined location. The downloaded electronic programming guides, interactive programming guides or the like are parsed to determine one or more channels that are unique between the plurality of service providers. The electronic programming guide data for the one or more channels that are unique between the plurality of service providers are checked against transmitting station identifier (TSID) data, program and system information protocol (PSIP) data or the like to identify the specific service provider that the television set is connected to. A channel list for the specific service provider is determined from the electronic programming guide or interactive programming guide corresponding to the specific service provider and stored as a channel map of the television set.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
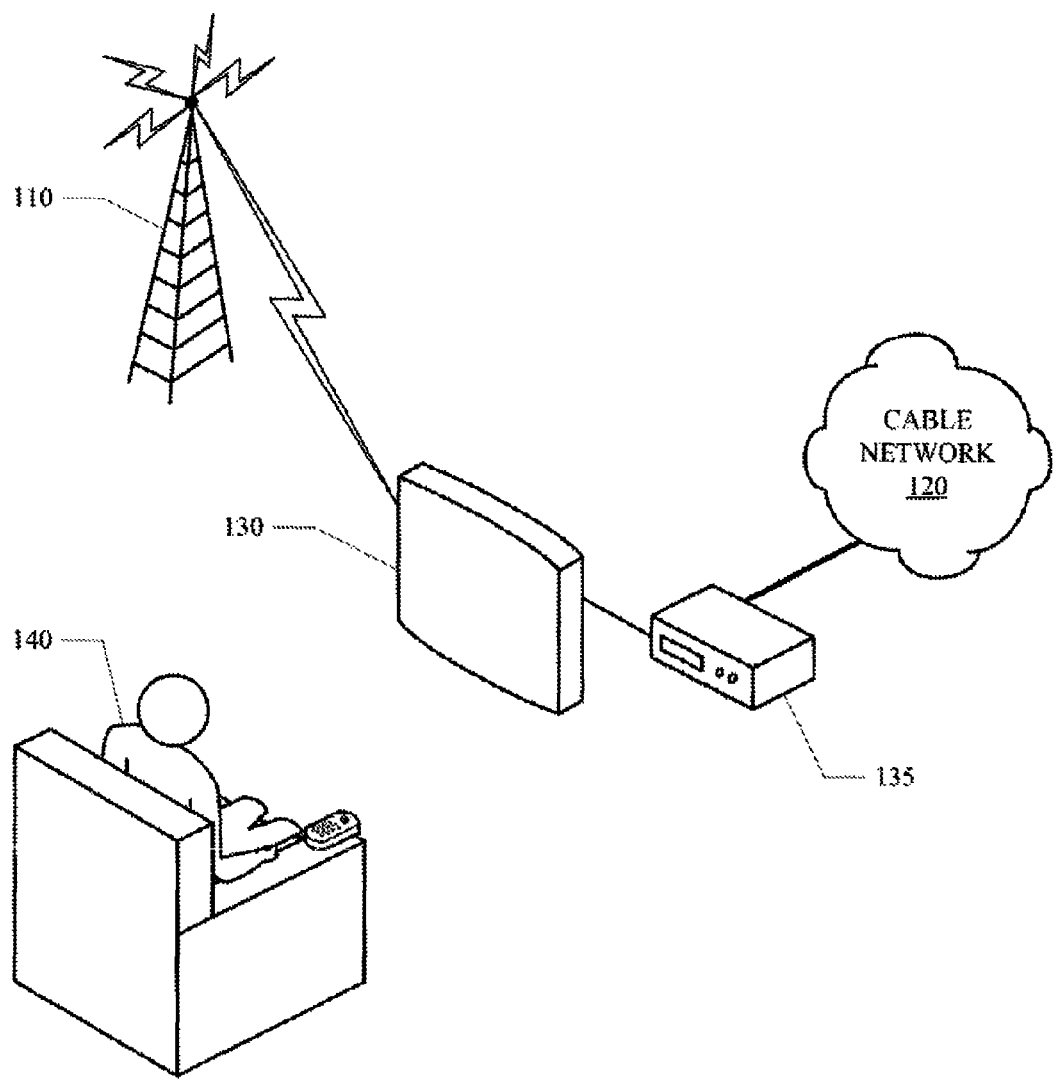
FIG. 1 shows a block diagram of an exemplary television system for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, an exemplary television system for implementing embodiments of the present technology is shown. The system 100 includes one or more television content sources 110, 120 that one or more televisions 130 can be communicatively coupled to. The television content sources may include one or more broadcast (e.g., wireless radio frequency (RF) transmission) service providers 110, one or more cable (e.g., wired network) service provides 120, and/or the like. For any given physical location of a given television set 130 there may be one or more television content sources 110, 120. For example, in a given metropolitan area there may be ten or more stations broadcasting content. The given metropolitan area may also be serviced by a cable television service provider. For each television content source 110, 120, there may be anywhere from one to hundreds of channels of content. For example, in the given metropolitan area a number of the stations may broadcast two or more channels of content while the other stations each broadcast a single station. In addition, the cable television service provider may transmit hundreds of channels of content on their cable network 120.

Figure 2:
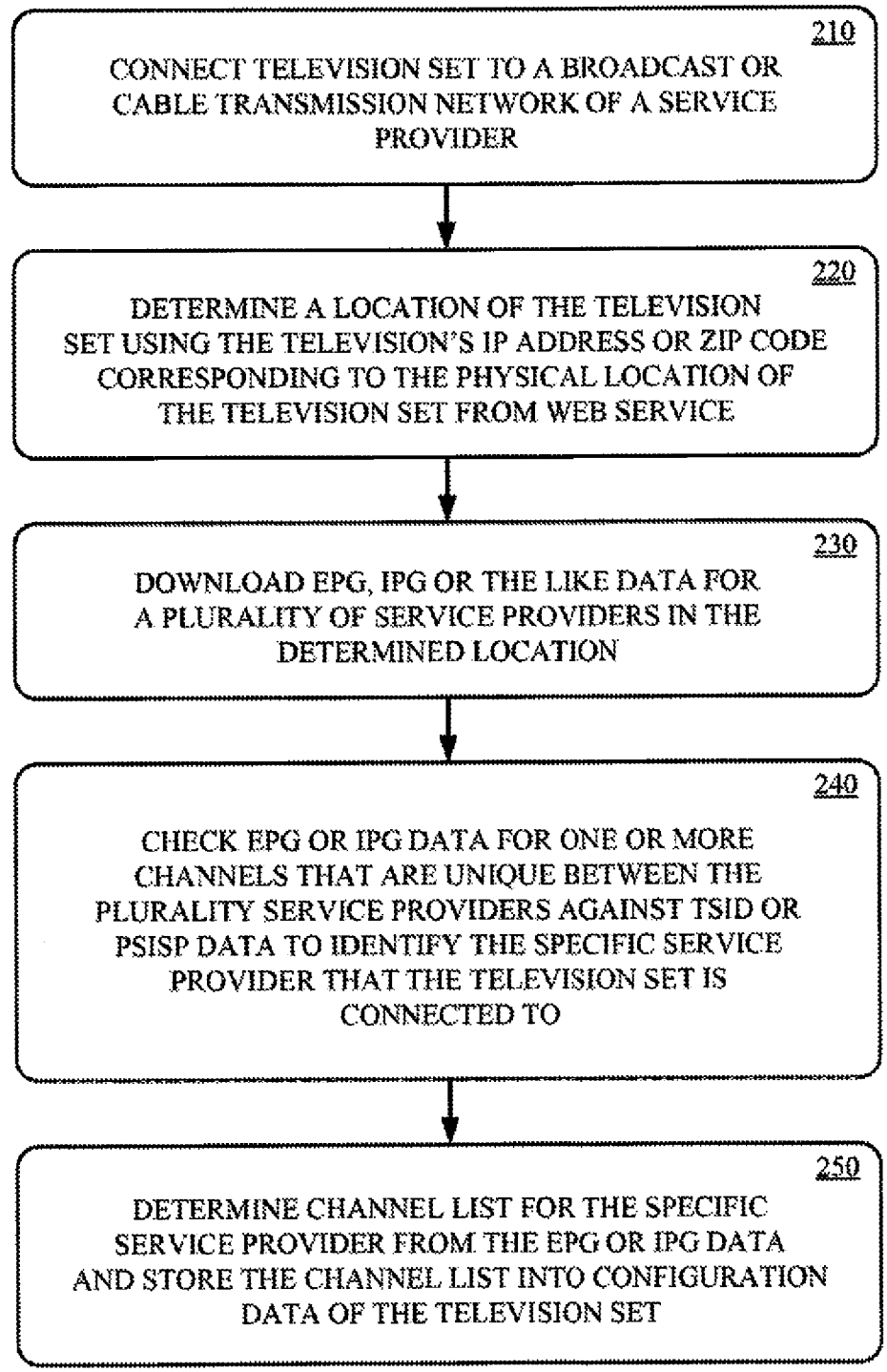
FIG. 2 shows a flow diagram of a method of configuring a television set to receive content from one or more television content sources, in accordance with embodiments of the present technology.

Operation of the television system will be further explained with reference to FIG. 2 in combination with FIG. 1. FIG. 2 shows a method of configuring a television set 130 to receive content from one or more television content sources 110, 120, in accordance with embodiments of the present technology. The method may be implemented as computing device-executable instructions (e.g., program) that are stored in computing device-readable media (e.g., memory) and executed by a computing device (e.g., processor). In one implementation, the method is implemented in a single discrete device, such as a television 130, a set top box (STB) 135, or the like. In another implementation, the method is implemented across a plurality of devices, such as a combination of the television 130 and the set top box 135.

The method begins with coupling a television set 130 to one or more broadcast television stations 110, one or more cable television service providers 120, and/or the like, at 210. At 220, the location of the television 130 is determined from a web service. In one implementation, the location may be determined using the television's internet protocol (IP) address from a web service. The web service may be provided through the cable network or a separate internet service connection such as a digital subscriber line (DSL), cellular telephone service (e.g., smart phone "app"), cable internet service, or the like. In another implementation, the location may be determined using a zip code corresponding to a physical location of the television 130 entered by a user 140. The zip code is used to determine the location from the web service for the context of configuring the television. The determined location may be a region such as a town, city, metropolitan area, county, borough, market, region, province, state, or the like. At 230, electronic programming guide (EPG) data, interactive programming guide (IPG) data, or the like data is downloaded for each of a plurality of service providers in the determined location. IPGs or EPGs may be available through the internet, mobile phone application, or the like. The data available through EPG, IPG, or the like includes designated channel numbers, advertised or virtual channel numbers, channel call letters, program names, program descriptions, program start and end times, program duration, program ratings, program genre, and the like.

At 240, EPG, IPG, or the like data for one or more channels that are unique between the plurality of service providers 110, 120 available in the determined locations is checked against transmitting station identifier (TSID) data, program and system information protocol (PSIP) data, or the like to identify the specific service provider that the television is connected to. The TSID data, PSIP data or the like may include designated channel numbers, advertised channel numbers, virtual channel numbers, call letters, program names, program descriptions, program start times, program end times, program durations, program ratings, program genres and/or the like. For example, IPG data may indicate a given sports channel is transmitted on designated channel 11 for both of the cable television service providers in the determined area, but that no broadcast television station transmits on designated channel 11. Furthermore, on the first cable television service provider, designated channel 18 is a particular shopping channel and is advertised as channel 18-1, while channel 18 is a particular documentary channel and is advertised as channel 42-1 on the second cable television service provider. Accordingly, if no TSID or PSIP data is available on designated channel 11 and TSIP or PSIP data received on designated channel 18 indicates that the channel is advertised channel 42-1 and is a particular documentary channel, than the comparison determines that the television is coupled to the second cable television service provider. At 240, a channel list, mapping or the like of the available channels is determined from the EPG, IPG or the like of the specific service provider and stored in the television. For example, if it is determined that the television is coupled to the second cable television service provider, the IPG data for the second cable television service provider is used to generate a channel list or mapping that is stored in the configuration data of the television. In one implementation, the channel mapping is stored as configuration data in non-volatile memory of the television 130. The channel list or mapping may be used by the television 130 to present only those channels that are available, for example, in response to the up and down channel commands.

Accordingly, embodiments of the present technology advantageously reduce the amount of time that it takes to configure a channel list or mapping of a television by determining the location of the television and comparing the EPG, IPG or the like data of a couple of channels that are different between the service providers in the determined location. By reducing the amount of time it takes to configure the channel list, embodiments of the present technology advantageously improve the user experience.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. An apparatus comprising:
   at least one processor;
   at least one computer memory accessible to the processor and including instruction which when executed by the processor configure the processor for:
   determining a location, from a web service, of an audio video device (AVD) communicating with a broadcast or cable transmission network of a service provider using an internet protocol address of the AVD or a zip code corresponding to a physical location of the AVD;
   downloading electronic programming guide or interactive programming guide for a plurality of service providers in the determined location;
   checking electronic programming guide data for one or more channels that are unique between the plurality of service providers against transmitting station identifier data or program and system in protocol data for the one or more channels to identify the specific service provider with which the AVD communicates; and
   determining a channel map for to specific service provider from the electronic programming guide or interactive programming guide corresponding to the specific service provider.

2. The apparatus of claim 1, wherein the web service comprises a cable internet service, digital subscriber line interne service or cellular telephone internet service.

3. The apparatus of claim 1, wherein the determined location comprises a town, a city, a metropolitan area, a county, a borough, a market, a region, a province, or a state.

4. The apparatus of claim 1, wherein the electronic programming guide or interactive programming guide is available through an internet service or a cellular telephone service.

5. The apparatus of claim 1, wherein the electronic programming guide or the interactive programming guide includes one or more categories of data selected from a group consisting of designated channel number, advertised channel number, virtual channel number, call letters, program names, program description, program start time, program end time, program duration, program rating, and program genre.

6. The apparatus of claim 1, wherein the transmitting station identifier data or program and system information protocol data includes one or more categories of data selected from a group consisting of designated channel number, advertised channel number, virtual channel number, call letters, program name, program description, program start time, program end time, program duration, program rating, and program genre.

7. The apparatus of claim 1, further comprising storing the channel map as configuration data in non-volatile memory of the AVD.

8. One or more non-transitory computing device readable media having computing device executable instructions which when executed perform a method comprising:
   determining a location, from a web service, of an audio video device (AVD) communicating with a broadcast or cable transmission network of a service provider using an internet protocol address of the AVD or a zip code corresponding to a physical location of the AVD;
   downloading electronic programming guide or interactive programming guide for a plurality of service providers in the determined location;
   parsing the downloaded electronic programming guide or interactive programming guide to determine one a or more channels thin are unique between the plurality of service providers;
   checking electronic programming guide data for the one or more channels that are unique between the plurality of service providers against transmitting station identifier data or program and system information protocol data to identify the specific service provider with which the AVD communicates;
   determining a channel list for the specific service provider from the electronic programming guide or interactive programming guide corresponding to the specific service provider; and
   storing the channel list into configuration data of the AVD.

9. The one or more computing device readable media having computing device executable instructions which when executed perform the method according to claim 8, wherein the web service comprises a cable internet service, digital subscriber line internet service or cellular telephone internet service.

10. The one or more computing device readable media having computing device executable instruction which when executed perform the method according to claim 8, wherein the determined location comprises a town, a city, a metropolitan area, a county, a borough, a market, a region, a province, or a state.

11. The one or more computing device readable media having computing device executable instructions which when executed perform the method according to claim 8, wherein the electronic pr programming guide or interactive programming guide is available through an internet service or a cellular telephone service.

12. The one or more computing device readable media having computing device executable instructions which when executed perform the method according to claim 8, wherein the electronic programming guide or the interactive programming guide includes one or more categories of data selected from the group consisting of designated channel number, advertised channel number, virtual channel number, call letters, program names, program description, program start, time, program end time, program duration, program rating, and program genre.

13. The one or more computing device readable media having computing device executable instructions which when executed perform the method according to claim 8, wherein the transmitting station identifier data or program and system information protocol data includes one or more categories of data selected from a group consisting of designated channel number, advertised channel number, virtual channel number, call letters, program name, program description, program start time, program end time, program duration, program rating, and program genre.

14. A system comprising:
   at least one digital processor configured for accessing executable instructions which when executed by the digital processor configure the digital processor for:
   determining a location, from a web service, of an audio video device (AVD) using an internet protocol address of the AVD or a zip code corresponding to a physical location of the AVD;

downloading electronic programming guide or interactive programming guide for a plurality service providers in the determined location;

checking electronic programming guide data or interactive programming guide data for one or more channels that are unique between the plurality of service providers against transmitting station identifier data or program and system information protocol data to identify a communicating service provider with which the AVD communicates; and determining a channel mapping for the specific service provider from the electronic programming guide or interactive programming guide corresponding to the specific communicating service provider.

15. The system of claim 14, wherein the processor when executing the instructions is configured for storing the channel mapping as configuration data in non-volatile memory of the AVD.

16. The system of claim 14, wherein the web service comprises a cable internet service, digital subscriber line internet service or cellular telephone internet service.

17. The system of claim 14, wherein the determined location comprises a town, a city, a metropolitan area, a county, a borough, a market, a region, a province, or a state.

18. The system of claim 14, wherein the electronic programming guide or interactive programming guide is available through an internet service or a cellular telephone service.

19. The system of claim 14, wherein the electronic programming guide or the interactive programming guide includes one or more data selected from the group consisting of a designated channel number, an advertised channel number, a virtual channel number, call letters, a program name, a program description, a program start time, a program end time, a program duration, a program rating, and a program genre.

20. The system of claim 14, wherein the transmitting station identifier data or program and system information protocol data includes one or more data selected from the group consisting of a designated channel number, an advertised channel number, a virtual channel number, call letters, a program name, a program description, a program start time, a program end time, a program duration, a program rating, and a program genre.

* * * * *